United States Patent [19]

Heidemann

[11] Patent Number: 5,091,985
[45] Date of Patent: Feb. 25, 1992

[54] OPTICAL SIGNAL CONNECTION DEVICE FOR UNITS TO BE INSERTED IN A RACK

[75] Inventor: Rolf Heidemann, Tamm, Fed. Rep. of Germany

[73] Assignee: Alcatel N.V., Amsterdam, Netherlands

[21] Appl. No.: 640,799

[22] Filed: Jan. 16, 1991

[30] Foreign Application Priority Data

Feb. 2, 1990 [DE] Fed. Rep. of Germany ....... 4003056

[51] Int. Cl.$^5$ .............................................. G02B 6/32
[52] U.S. Cl. ..................................... 385/33; 359/124; 359/127; 385/37; 385/49; 385/53
[58] Field of Search ............... 350/96.10, 96.11, 96.12, 350/96.15, 96.16, 96.17, 96.18, 96.19, 96.20, 96.21, 96.22; 455/610, 612; 370/1, 3

[56] References Cited

U.S. PATENT DOCUMENTS

| | | | |
|---|---|---|---|
| 3,674,914 | 7/1972 | Burr | 350/96.17 X |
| 4,432,604 | 2/1984 | Schwab | 350/96.21 |
| 4,465,333 | 8/1984 | Caserta et al. | 350/96.20 |
| 4,653,845 | 3/1987 | Tremblay et al. | 350/96.16 |
| 4,732,446 | 3/1988 | Gipson et al. | 350/96.15 |

Primary Examiner—John D. Lee
Attorney, Agent, or Firm—Spencer & Frank

[57] ABSTRACT

In a signal connecting device for the establishment of communication paths between insertable units in a rack in which signal connections are formed by at least one optical waveguide which is associated with a rear panel of the rack, coupling is effected by imaging lenses associated with the insertable units. When a unit is inserted, its associated lenses are disposed opposite or lie against the optical waveguide of the rear panel.

13 Claims, 3 Drawing Sheets

OPTICAL SIGNAL CONNECTION DEVICE FOR UNITS TO BE INSERTED IN A RACK

CROSS REFERENCE TO RELATED APPLICATION

This application claims the priority of Application Ser. No. P 40 03 056.3, filed Feb. 2, 1990, in the Federal Republic of Germany, the subject matter of which is incorporated herein by reference.

BACKGROUND OF THE INVENTION

This invention relates to a signal connecting device for the establishment of communication paths between the insertable units of a rack.

In many fields of the electronic art it is customary to produce individual component groups or devices as insertable units which are inserted into a rack. The individual insertable units are conventionally connected with one another by way of coaxial copper cables. Such a configuration is realized, for example, in a broadband exchange system. The described cable connections for the rack are very expensive.

SUMMARY OF THE INVENTION

It is therefore the object of the invention to provide a signal connection device for the establishment of communication paths between insertable units of a rack, wherein the device is of very simple construction and nevertheless is suitable for the highest signal transmission speeds.

This is accomplished according to the invention in that each signal connection is formed by an optical waveguide associated with the rear panel of rack, with the coupling being effected by means of imaging lenses in the insertable units which, when inserted, are disposed opposite or lie against the optical waveguide on the rear panel. The use of optical signal paths permits the highest signal transmission rates. Nevertheless, the costs of this type of optical communication remain very low. A rear panel is may be employed which is equipped with optical waveguides. In the inserted position, a respective imaging lens of the insertable unit goes into operative connection with the optical waveguide disposed in the rear panel so that an optical signal can be coupled in and out of the unit. This coupling-in and coupling-out is effected by the imaging lens of the insertable unit being disposed opposite or against the optical waveguide of the rear panel. Expensive plug-in connections, as required for the prior art coaxial copper cables, are therefore not needed.

According to a further feature of the invention, the optical waveguide is arranged on or in a carrier sheet disposed on a support of the rear panel. The rear panel is thus composed of several "layers". A first layer comprises a support to which a carrier sheet is applied in order to enable the optical waveguide, which is rather thin so as to permit the transmission of ultrahigh frequencies, to be manipulated. The optical waveguide may be applied to the surface of the carrier sheet or it may be imbedded therein. Insertion of the insertable units brings the imaging lens into a position opposite the optical waveguide. In this way, for example, an optical signal produced by one insertable unit by a laser diode is coupled into the optical waveguide by way of the imaging lens, and is then coupled out of the optical waveguide at a different location through the imaging lens of another insertable unit and fed, for example, to a photodiode receiver of this insertable unit.

In particular, the optical waveguide may be formed over the entire surface of or in the carrier sheet, with the carrier sheet completely covering the surface of the plate-shaped support. According to another embodiment, it is also possible for the carrier sheet equipped with the optical waveguide to cover only certain partial regions of the support. This overall or partially covering configuration permits coupling-in and coupling-out at different locations of the optical waveguide since the waveguide constitutes a planar structure. In this way, it is possible to establish, for example, a point-to-multipoint connection, that is, a signal, particularly a clock signal, is coupled into the planar optical waveguide at one point and is coupled out again for different insertable units at corresponding other locations. Of course, a multipoint-to-point connection is also conceivable as is a multipoint-to-multipoint connection.

According to another embodiment, the optical waveguide is configured as a strip which is disposed on or in the carrier sheet. In this way, a point-to-point connection can be established, that is, a fixed connection from a certain insertable unit to another insertable unit. If several insertable units are to be interconnected, several strip-shaped optical waveguides may be associated with the rear panel. If this brings about crossovers between the individual optical waveguide strips, the latter may be formed in different layers of the carrier sheet.

Additionally, openings may be provided to accommodate conductor paths in the carrier sheet. The conductor paths are disposed on the side of the support facing the insertable units and are charged by the spring contacts of the insertable units. In this way it is possible, for example, to bring the supply voltage to the individual insertable units. However, it is also possible to configure communication paths in this way in addition to the optical signal connections according to the invention.

It is advantageous if a coupling structure is formed in the foil and in the optical waveguide at the coupling-in and coupling-out locations. The coupling structure permits coupling the transmitted light into the optical waveguide and coupling it out to feed it to a receiving unit.

The coupling structure may be formed, for example, of a grating, particularly a holographic grating. It is also possible to merely scratch the sheet in the region of the coupling-in and coupling-out locations, at a suitable location during the first insertion of an insertable unit - that is, opposite to the imaging lens. The grating may be, in particular, a sinusoidal grating, a triangular grating or a sawtooth grating. According to a preferred embodiment, it is also possible to construct the grating to have a varying periodicity. This means that the period of the grating changes over its longitudinal extent. These measures serve to form beams at the coupling-in and coupling-out locations. Ultimately this minimizes coupling attenuation between the optical waveguide and the optical transmitter and receiver, respectively.

BRIEF DESCRIPTION OF THE DRAWINGS

The drawing figures illustrate embodiments of the invention in which.

DETAILED DESCRIPTION OF THE PREFERRED EMBODIMENTS

Figure 1:
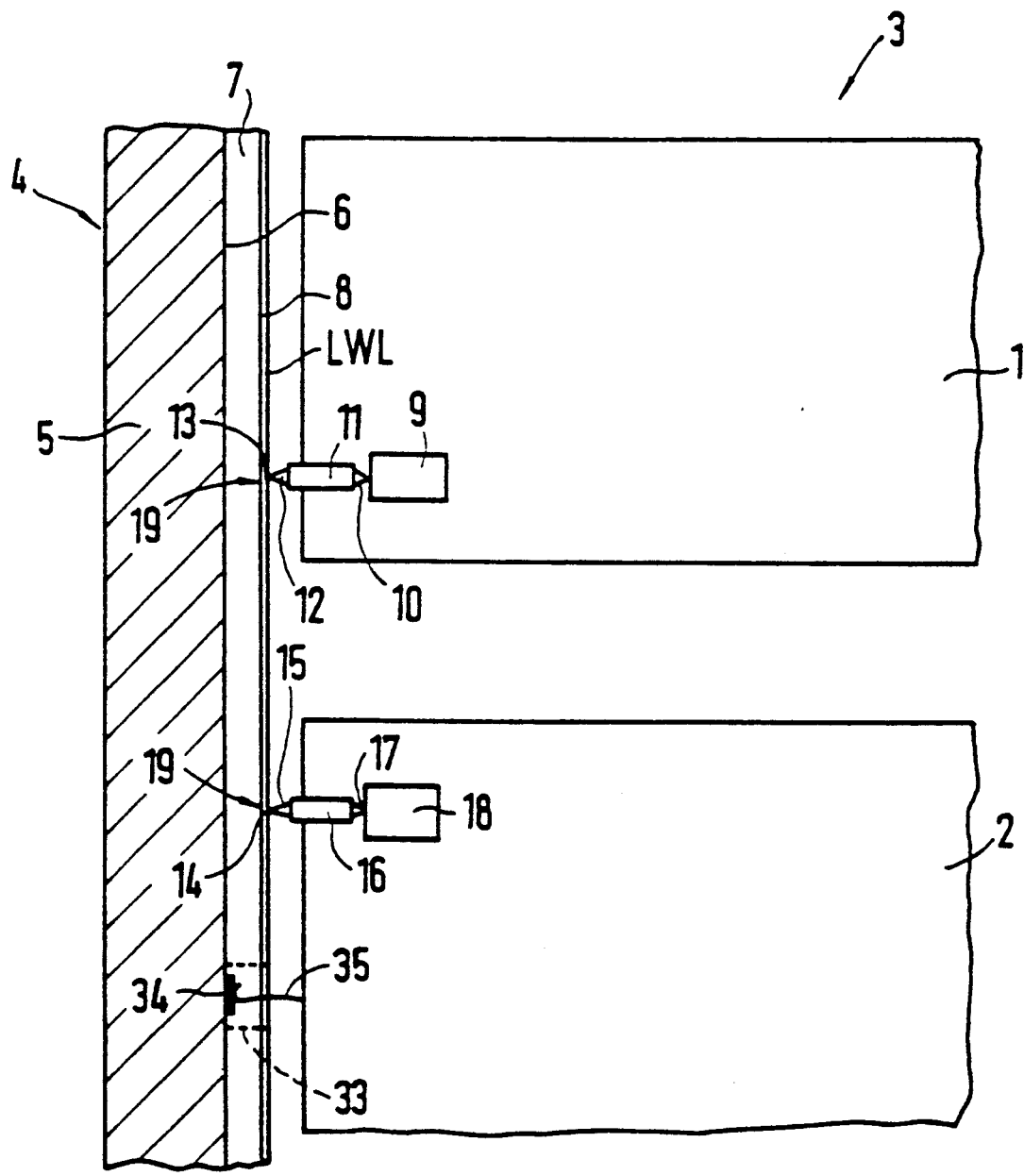
FIG. 1 is a schematic side view of a rack equipped with two insertable units.

FIG. 1 is a schematic side view of two insertable units 1 and 2 which are inserted into a rack (not shown). The two insertable units 1 and 2 are shown in the inserted position. Insertable units 1 and 2 are equipped with electronic circuits which may belong, for example, to a broadband exchange system.

A signal connecting device 3 is provided in which communication paths are established between insertable units 1 and 2. The broadband exchange system may of course also be composed of more than just two insertable units; however, to clearly demonstrate the invention it is sufficient to discuss only insertable units 1 and 2.

The signal connections of the communication paths between insertable units 1 and 2 are configured as optical waveguides LWL. The establishment of the communication paths includes the rear panel 4 of the rack. For this purpose, the rear panel is provided with a plate-shaped support 5 which constitutes a mechanical support. On its side 6 facing insertable units 1 and 2, a carrier sheet 7 is applied over its entire surface. On its side 8 facing insertable units 1 and 2, this carrier sheet is equipped with a planar optical waveguide LWL.

According to another embodiment that is not illustrated, it is also possible for the optical waveguide LWL to be embedded in carrier sheet 7.

Let it be assumed that information is to be transmitted from insertable unit 1 to insertable unit 2. For this purpose, insertable unit 1 includes a laser diode module 9. The use of, for example, an LED module is also conceivable. The light 10 generated by laser diode module 9 is transmitted to an imaging lens 11 which is, for example, configured as a self-focusing lens. The light beam 12 impinges at coupling-in location 13 on the planar optical waveguide LWL and is consequently transmitted to a coupling-out location 14. The light 15 emanating from there is again bundled by means of an imaging lens 16, with the light beam 17 being conducted to a photodiode module 18.

While laser diode module 9 operates as transmitter, photodiode module 18 constitutes a receiver.

At coupling-in and coupling-out locations 13 and 14, respectively, optical waveguide LWL may be provided with coupling structures 19. This is possible, in particular, in that an optical grating, particularly a holographic grating, is formed at these locations. This grating may preferably be a sinusoidal grating, or, according to another embodiment, also a triangular grating or, according to a further embodiment, a sawtooth grating. In this connection, the procedure is here such that the periodicity of the grating (the spacing of the individual gaps in the grating) is adapted to the wavelength of the light moving through optical waveguide LWL. In particular, it is also possible for the respective grating—when seen over its expanse—to have different periodicities; that means, the spaces between the individual gaps in the grating are different. It is always desired in this connection for the light to be coupled into optical waveguide LWL with high efficiency and also to be coupled out with high efficiency. Since the shape and direction of the light beam coupled out at the coupling location by means of the grating is a function of the wavelength of the light, wavelength multiplex connections also become possible. For example, two transmitters and two (or more) receivers then operate at different wavelengths over one optical waveguide (unidirectional operation). Moreover, bidirectional operation is also possible, in which case two different wavelengths then serve to carry signals in different directions. One insertable unit then would include a transmitter as well as a receiver.

Figure 2:
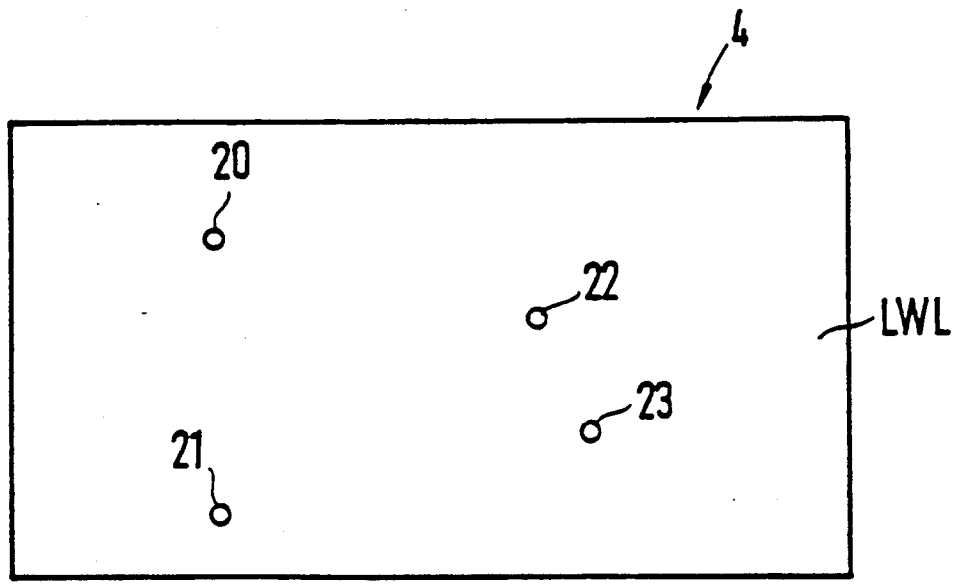
FIG. 2 is a plan view of the rear panel of a rack equipped with optical waveguides.

Due to the optical waveguide LWL having a planar configuration, it is possible, according to FIG. 2, to feed light in, for example, at the coupling-in location 20 shown there and to couple light out at coupling-out locations 21, 22 and 23 from which it is fed to the corresponding insertable units. This is then a so-called point-to-multipoint connection; that is, the light is fed in at one point and is picked up at several points.

In a corresponding manner it is also possible to establish multipoint-to-multipoint connections; that is, the light is fed in at many points and is also picked up at many points. Finally the arrangement may be configured in such a way that light is fed in at many points and is picked up at only one point. This is then a multipoint-to-point connection.

Figure 3:
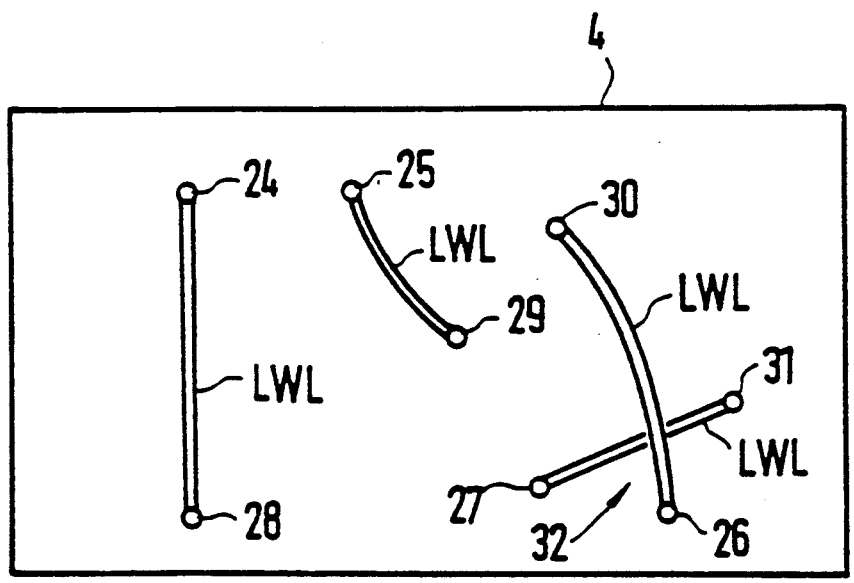
FIG. 3 shows a rear panel equipped with strip-shaped optical waveguides.

FIG. 3 shows a further rear panel 4 which, in contrast to that of FIG. 2, does not have a full-area optical waveguide LWL but strip-shaped optical waveguides LWL. In this way, coupling-in locations 24, 25, 26 and 27 can be connected with coupling-out locations 28, 29, 30 and 31 which—as already described in connection with FIG. 1—lie opposite corresponding imaging lenses of the associated insertable units. Otherwise the configuration of the rear panel 4 of FIG. 3 corresponds to that of FIG. 1. Optical waveguides 32 that cross over one another are accommodated in different layers of carrier sheet 7 in rear panel 4, so that no mutual influencing occurs.

FIG. 1 further shows that carrier sheet 7 may be provided with openings 33 in which conductor paths 34 are disposed. The latter are disposed on the side 6 of support 5. They cooperate with spring contacts 35 of insertable units 1 and 2, respectively (not shown for insertable unit 1). With this measure it is possible to establish electrical connection paths between insertable units 1 and 2. Moreover, these electrical contact connections may be employed to feed in the supply voltage.

Figure 4:
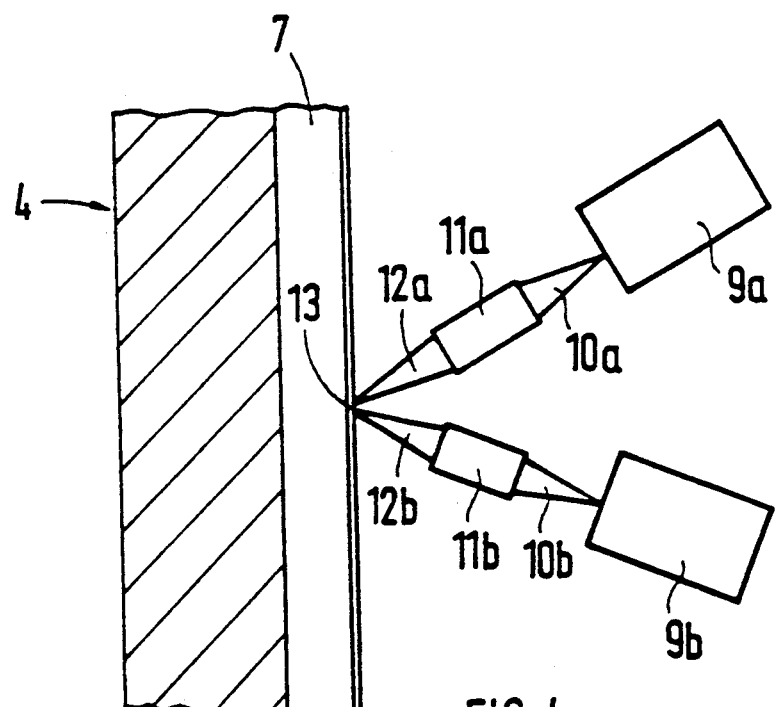
FIG. 4 shows a configuration as a multiplex connection.

Since, as already mentioned, the shape and direction of the light beam coupled in and out at coupling-in location 13 by means of the grating is a function of the wavelength of the light, it is also possible to establish wavelength multiplex connections. This is shown in FIG. 4. Here, for example, two laser diode modules 9a and 9b operate as transmitter on different wavelengths over one optical waveguide (unidirectional operation). However, as already mentioned, bidirectional operation is also possible if the directions are separated by means of different wavelengths. Each insertable unit then would have a transmitter as well as a receiver. In FIG. 4, the imaging lenses are marked 11a and 11b, respectively. The light is identified by the reference numerals 10a, 10b and 12a, 12b, respectively. In particular, the light wave multiplexers may be inherent components of the optical waveguide inputs and outputs. This means that they are not a part of exchangeable component groups (insertable units).

It will be understood that the above description of the present invention is susceptible to various modifications, changes and adaptations, and the same are intended to be comprehended within the meaning and range of equivalents of the appended claims.

What is claimed is:

1. A signal connecting device for establishing communication paths between insertable units of a rack having a rear panel by one or more signal connections, wherein each signal connection comprises:
   at least one optical waveguide having inputs and outputs; and
   imaging lenses associated with the insertable units, coupling between the at least one waveguide and the insertable units being effected by the imaging lenses of associated insertable units, an imaging lens, when its associated unit is inserted, being disposed opposite or against the at least one optical waveguide;
   wherein the at least one optical waveguide is disposed on or in a carrier sheet arranged on a support of the rear panel, a coupling structure being formed in the carrier sheet and in the at least one optical waveguide at coupling-in and coupling-out locations, the coupling structure in the carrier sheet being formed by a grating.

2. A signal connecting device according to claim 1, wherein the carrier sheet is provided with openings to accommodate conductor paths which are disposed on the side of the support facing the insertable units and are under the pressure of spring contacts of the insertable units.

3. A signal connecting device according to claim 1, wherein the at least one optical waveguide is formed over the entire surface of or in the carrier sheet, said carrier sheet covering the entire surface of the support.

4. A signal connecting device according to claim 1, wherein the at least one optical waveguide is configured as a strip on or in the carrier sheet.

5. A signal connecting device according to claim 1, wherein the at least one optical waveguide comprises a plurality of strip-shaped optical waveguides.

6. A signal connecting device according to claim 5, wherein strip-shaped optical waveguides that cross one another are disposed in different layers of the carrier sheet.

7. A signal connecting device according to claim 1, wherein the grating is configured as a sinusoidal grating.

8. A signal connecting device according to claim 1, wherein the grating is configured as a triangular grating.

9. A signal connecting device according to claim 1, wherein the grating is configured as a sawtooth grating.

10. A signal connecting device according to claim 1, wherein the grating has a varying periodicity.

11. A signal connecting device according to claim 1, wherein wavelength multiplexing is used such that, due to the wavelength dependent refraction behavior of the grating, a plurality of signals at different wavelengths are carried on a single one of the at least one optical waveguides, at least two optical transmitters and/or at least two optical receivers being disposed on an insertable unit.

12. A signal connecting device according to claim 11, wherein the at least one optical waveguide include multiplexers disposed at inputs and outputs thereof.

13. A signal connecting device according to claim 11, wherein wavelength multiplexing permits bidirectional operation between at least two insertable units.

* * * * *